W. I. CHINNICK.
BEARING.
APPLICATION FILED SEPT. 9, 1912.
1,061,899.
Patented May 13, 1913.
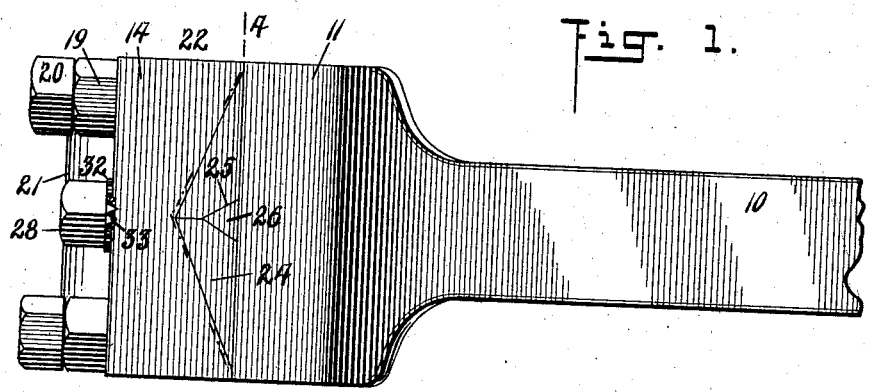
Fig. 1.
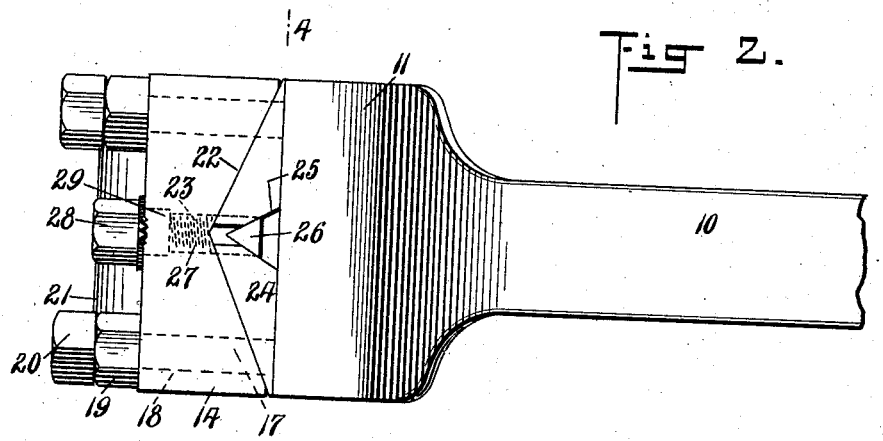
Fig. 2.
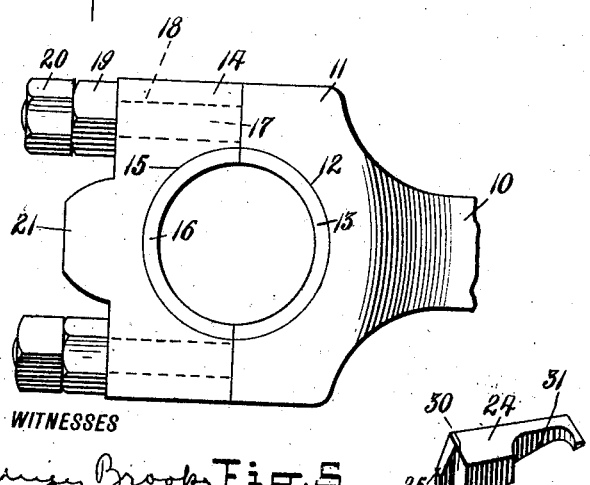
Fig. 3.
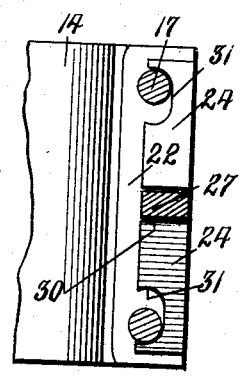
Fig. 4.
Fig. 5.
WITNESSES
INVENTOR
Walter I. Chinnick.
BY
ATTORNEYS

UNITED STATES PATENT OFFICE.

WALTER IVINS CHINNICK, OF TRENTON, NEW JERSEY.

BEARING.

1,061,899.  Specification of Letters Patent.  Patented May 13, 1913.

Application filed September 9, 1912. Serial No. 719,353.

*To all whom it may concern:*

Be it known that I, WALTER I. CHINNICK, a citizen of the United States, and a resident of Trenton, in the county of Mercer and State of New Jersey, have invented a new and Improved Bearing, of which the following is a full, clear, and exact description.

This invention relates to bearings for use in connection with prime movers, and for other like purposes, and has reference more particularly to a device of this class which comprises relatively movable members adapted to receive the Babbitt metals or brasses between the same, and provided with an adjusting device operable to spread the members, means being provided for holding the members together in the usual manner.

The object of the invention is to provide a simple, inexpensive and durable bearing which can be applied to all the various purposes for which bearings are used, which is strong in construction, compact in form, and comparatively light in weight, and which can be rapidly and easily adjusted by a simple manipulation, to take up wear and to fit the bearing exactly to the member journaled therein.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of the end of a connecting rod having an embodiment of my invention applied thereto; Fig. 2 is a similar view showing certain of the parts in different positions; Fig. 3 is a plan view of the bearing; Fig. 4 is a transverse section on the line 4—4 of Fig. 1; and Fig. 5 is a perspective view of a detail of the structure.

Before proceeding to a more detailed explanation of my invention, it should be clearly understood that while I have exemplified it in the embodiment shown hereinwith as applied to a connecting rod, the invention can be employed for numerous other purposes, and can be constructed in different sizes, shapes and proportions. Needless to say, the actual bearing metals employed with the bearing may be of different kinds, consisting for example, of Babbitt metals, or brasses. For simplicity, I have herein designated these parts as "bearing metals."

Certain of the details of construction shown for example herewith, form no part of the invention, and can be varied in accordance with individual preference or special conditions, without departing from the underlying spirit of the invention.

Referring more particularly to the drawings, the bearing illustrated for example is located at the end of a connecting rod 10, which, at the extremity, is laterally extended to form one of the bearing members 11 having in the outer face thereof a substantially semi-circular recess 12 in which is received one of the bearing metals 13. The second bearing member, 14, is disposed against the member 11, and has in the inner face thereof a substantially semi-cylindrical recess 15 registering with the recess 12, and like the same, provided with a bearing metal 16. The member 11 has near the corners, longitudinally extended threaded studs 17 passing through suitable openings 18, in the member 14. Clamping nuts 19 and lock nuts 20 are screwed upon the threaded, projecting ends of the studs and serve to clamp the two bearing members together in the customary manner. If so desired, the outer member 14 of the bearing may be provided with a strengthening rib 21.

The outer bearing member 14, at opposite sides, is cut away to form triangular recesses 22, the apexes of which are centrally disposed with respect to the side faces of the clamping member, and the outer ends of which terminate substantially at the outer edges of the lateral faces in which the recesses are formed, as is clearly shown in Figs. 1 and 2. The member 14 has formed therein openings 23 each extending from the outer face of the member to one of the recesses 22 at the apex thereof. Mounted within each of the recesses 22 is a pair of wedges 24, similarly formed and oppositely disposed, so that normally, the wedges substantially fill the recesses 22. The wedges, at their adjacent faces are cut away so that when they are in juxtaposition they form a triangular opening 25 in which is received a correspondingly-shaped lug 26 of a threaded adjusting member 27 located in one of the openings 23. The lug 26 is in effect a forward offset of the adjusting member, and when moved toward the apex of the recess 22 serves to spread or to force apart the wedges 24, as is shown in Fig. 3, whereby the bearing members are correspondingly separated. An adjusting nut 28 having a collar or extension 29 in the suitably formed recess 23 is screwed upon each of the threaded adjusting members. By means of these nuts the members can be operated as will be readily understood, to spread the wedges 24. The latter at their inner ends have cutaway parts 30 to admit the lower end of the adjusting member which carries the triangular lug 26. At the other ends, the wedges likewise have round, elongated cutaway parts 31 in which are received the studs 17, and which permit the wedges to be moved in the directions of their lengths. Associated with the adjusting nuts 28 are lock collars 32 having peripheral serrations 33 adapted to be bent down over the edges of the bearing member 14 to hold the adjusting nuts.

In the initial adjustment of the bearing when it is provided with new bearing metals, the wedges 24 are spread apart as far as possible. The bearing metals are so proportioned that they fit accurately with this adjustment of the bearing and are thus normally disposed with respect to the member journaled in the bearing. The nuts 19 and 20 are tightened and the bearing is ready for use. When it is necessary to readjust the bearing to take up wear, the adjusting nuts 28 are suitably turned so that the adjusting members with their lugs 26 recede toward the bearing member 11. By tightening the nuts 19 and 20 the bearing member 14 can subsequently be moved toward the bearing member 11, until the bearing is again in normal condition and the metals fit snugly about the member journaled in the bearing. When this adjustment has been effected the adjusting nuts are again locked by means of the collars 32.

Having thus described my invention I claim as new, and desire to secure by Letters Patent:—

1. In a bearing, two relatively movable members having bearing material for the part journaled therein, one of said members having a triangular recess at each side thereof the apex of which is transverse to the journal; a pair of wedges in each of said recesses intermediate said members operable in a direction parallel to the journal; means in said recesses intermediate said wedges for operation of the said wedges; and clamping means associated with said members whereby the same are normally forced against said wedges intermediate said members.

2. In a bearing, two relatively movable members having bearing material for the part journaled therein, one of said members having a triangular recess at each side thereof, said recesses having the apex of same transverse to the part journaled therein; a pair of wedges in each of said recesses at each side of said apex and intermediate said members; means in said recesses intermediate said wedges and central with said apex for relative adjustment of said wedges in a direction parallel to said journal; and clamping means associated with said members whereby the same are normally forced against said wedges intermediate said members.

3. In a bearing, two relatively movable members having bearing material for the part journaled therein, one of said members having a triangular recess at each side thereof with the apex transverse to the journal; a pair of substantially identical wedges in each of said recesses intermediate said members; means in said recesses intermediate said wedges and central with said recesses for relative adjustment of said wedges in a direction parallel to the journal; and clamping means associated with said members whereby the same are normally forced against said wedges intermediate said members.

4. In a bearing, two relatively movable members having bearing material for the part journaled therein, one of said members having a triangular recess at each side thereof, said recesses having their apex transverse to the part journaled therein and central with the same; a pair of substantially identical wedges in each of said recesses central of said apex and intermediate said members; adjustable members in the member having the triangular recesses and projecting through the apex of said recesses intermediate said wedges; means on said adjustable members and said wedges whereby said wedges are made operable in a direction parallel to the axis of rotation; and clamping means associated with said members whereby the same are normally forced against said wedges intermediate said members.

5. In a bearing two relatively movable members having bearing material for the part journaled therein, one of said members having a triangular recess at each side thereof, said recesses having their apex central with said journaling part and transverse to the axis of rotation; bolts positioned at each side of said member having the recesses and projecting through the apex of said recesses, said bolts having the parts projecting into said recesses triangular shaped, the base of same being parallel to the axis of rotation; a pair of substantially identical wedges in each of said recesses intermediate said relatively movable members and at each side of said triangular projection of said bolts, said wedges having means at the sides adjacent said triangular projection coacting with same whereby the relative distance between said wedges may be varied; and clamping means associated with said members whereby the same are normally forced against said wedges intermediate said members.

6. In a bearing, two relatively movable members having bearing material for the part journaled therein, one of said members having a triangular recess at each side thereof, said recesses having their apex transverse to said journaling part and normal to the axis of rotation; bolts positioned at each side of said member having the recesses and projecting through the apex of said recesses, said bolts having the parts projecting into said recesses triangular shaped, the base of same being parallel to the axis of rotation; a pair of substantially identical wedges in each of said recesses intermediate said relatively movable members and at each side of said triangular projection of said bolts; and clamping means associated with said member whereby the same are normally forced against said wedge intermediate said members, said wedges having the sides adjacent to said triangular projection similarly inclined as the sides of the triangular projection and normally bearing against same; and notches on the inner side near the opposite end for clearing said clamping means in said members so as not to interfere with said clamping means when said wedges move in a direction parallel to the axis of rotation.

In witness whereof I have signed my name to this specification in the presence of two subscribing witnesses.

WALTER IVINS CHINNICK.

Witnesses:
 JOHN MATHESON,
 S. HARRY TITUS.

Copies of this patent may be obtained for five cents each, by addressing the "Commissioner of Patents, Washington, D. C."